United States Patent [19]

Cortes

[11] Patent Number: 4,892,574
[45] Date of Patent: Jan. 9, 1990

[54] APPARATUS FOR THE HORIZONTAL BENDING AND TEMPERING OF GLASS SHEETS

[75] Inventor: Sergio V. Cortes, Sector Monterrey, Mexico

[73] Assignee: Vitro Flex, S.A., Mexico

[21] Appl. No.: 217,667

[22] Filed: Jul. 11, 1988

[51] Int. Cl.⁴ .......................................... C03B 23/025
[52] U.S. Cl. ...................................... 65/273; 65/104; 65/107; 65/290; 65/291
[58] Field of Search ................. 65/104, 106, 107, 273, 65/290, 291

[56] References Cited

U.S. PATENT DOCUMENTS

| | | | |
|---|---|---|---|
| 3,037,324 | 6/1962 | Carson | 65/290 X |
| 4,204,854 | 5/1980 | McMaster et al. | 65/106 |
| 4,282,026 | 8/1981 | McMaster et al. | 65/273 |
| 4,356,018 | 10/1982 | McMaster | 65/104 |
| 4,386,952 | 6/1983 | Nitschke | 65/268 |
| 4,437,871 | 3/1984 | McMaster et al. | 65/104 |
| 4,437,872 | 3/1984 | McMaster et al. | 65/104 |
| 4,483,702 | 11/1984 | Frank et al. | 65/104 X |
| 4,501,603 | 2/1985 | Frank et al. | 65/106 |
| 4,514,208 | 4/1985 | Nitschke | 65/106 X |
| 4,517,001 | 4/1985 | McMaster | 65/273 |
| 4,609,391 | 9/1986 | McMaster | 65/104 |

FOREIGN PATENT DOCUMENTS 0250311 12/1987 European Pat. Off. ............. 65/107

Primary Examiner—Arthur Kellogg
Attorney, Agent, or Firm—Bernard, Rothwell & Brown

[57] ABSTRACT

The critical peripheral sections of glass sheets are bent to a deep or sharp curvature through the use of a plurality of press forming means integrally provided on the mold ring of a gravity bending and tempering horizontal lehr, said press forming means each comprising a machined press forming die articulated to a retractible arm, said press forming die having a shape complementary to the specific shape desired at the sheet glass section to be press formed, said retractible arm being actuated between a retracted and an operative or press forming position by driving means capable of providing thereto a controlled motion, speed and pressure to carry out the press forming operation an instant after the glass sheet has been deposited on the mold ring ant to be retracted an instant before the glass sheet enters the tempering section.

6 Claims, 6 Drawing Sheets

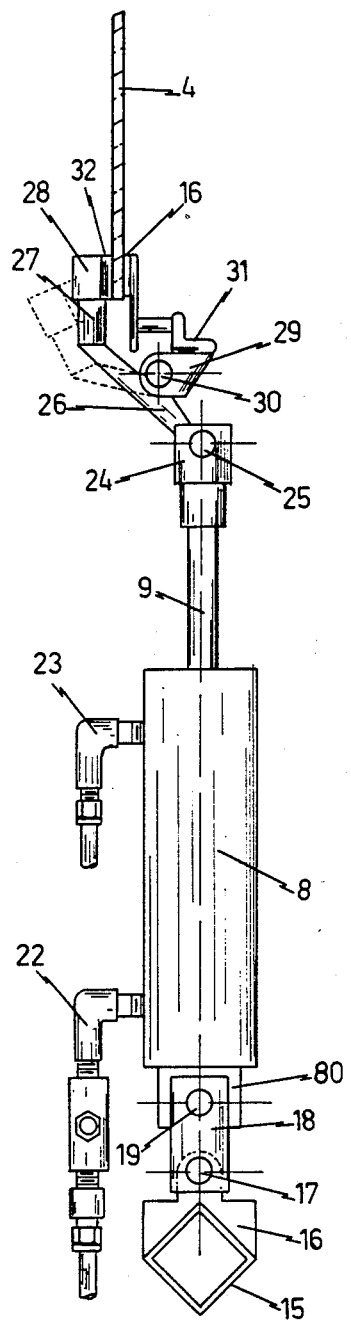
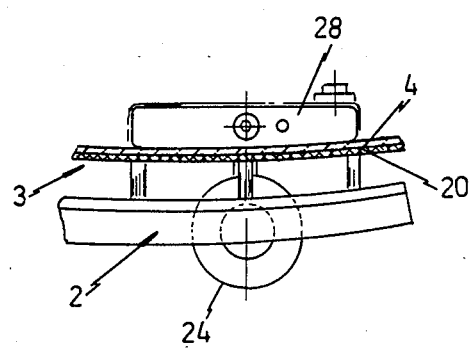
FIG. 3
FIG. 4

4,892,574

APPARATUS FOR THE HORIZONTAL BENDING AND TEMPERING OF GLASS SHEETS

FIELD OF THE INVENTION

The present invention refers to the horizontal bending and tempering of glass sheets, particularly of the type used for back windows, and more particularly relates to improvements in an apparatus for bending the critical peripheral sections of glass sheets to a deep or sharp curvature.

BACKGROUND OF THE INVENTION

Apparatus for bending glass sheets are very well known in the art, and many variations of said apparatus exist in the marketplace. Basically an apparatus for bending glass sheets comprises a carrier ring mold which moves under a supported glass sheet, said glass sheet being supported by either air jets under the sheet, or by means of a ceramic perforated holder mold which holds the sheet by means of vacuum or by any combination of said supporting devices. The air jets or the vacuum is then terminated so that the glass drops onto the ring and bends under the bias of gravity in a manner that allows thin glass to be accurately bent. Subsequently the mold ring is moved from the furnace to a quench unit between upper and lower blastheads that temper the bent glass.

Thus, U.S. Pat. No. 4,282,026 describes an apparatus for bending and tempering glass sheets, wherein sheet glass is heated during conveyance on a conveyor within a furnace. A vacuum holder is positioned within the furnace housing above the conveyor and has a downwardly facing surface with spaced openings in which a vacuum is drawn to receive a glass sheet from the conveyor and support the sheet above the conveyor. A carrier mold ring moves under the supported glass and the vacuum is then terminated so the glass drops onto the ring and bends under the bias of gravity in a manner that allows thin glass to be accurately bent. Subsequently the mold ring is moved from the furnace to a quench unit that tempers the bent glass.

U.S. Pat. No. 4,386,952 describes a glass sheet bending system which utilizes gas jets for the bending operation and which comprises a compressed gas bending unit located above a horizontal conveyor on which glass sheets are heated within a furnace. A downwardly facing curved surface of a holder above the conveyor receives a heated glass sheet for bending. Compressed gas fed through outlets of the bending unit provides inclined gas jets directed in a generally perpendicular relationship to the holder surface with a sufficient intensity to bend the glass sheet on the holder to the curved shape of its surface. A blow-up unit and a vacuum drawing unit for the holder and a vertically operable actuator for the holder preferably cooperate with the bending unit. A curved mold is moved to below the holder to receive the bent glass sheet and further bending of the glass sheet preferably takes place on the mold under the operation of gravity. The system also includes a quench unit to which the mold moves the bent glass sheet for tempering.

U.S. Pat. No. 4,437,871 describes an apparatus for bending glass sheets which is very similar to the apparatus of U.S. Pat. No. 4,282,026, with an improved vacuum support of the glass sheets, by providing a greater vacuum to initially support the glass and a lesser vacuum to subsequently prevent glass deformation at the spaced openings of the holder. Sensors are provided for sensing the glass position along the conveyor and operation of a locator cooperatively provide accurate positioning of the glass on the holder surface without requiring the conveyor to be stopped prior to the holder operation.

U.S. Pat. No. 4,437,872 describes an apparatus which is identical to that of U.S. Pat. No. 4,437,871, with improved conveyance system.

U.S. Pat. No. 4,517,001, in turn, describes, an apparatus for bending glass sheets which operates under the same principle mentioned for the above identified patents, and which also uses a mold ring positioned within a furnace to deposit thereon the glass sheet transported by the vacuum holder, after removing the vacuum so that the glass sheet bends under the force of gravity on said mold ring.

None of the above described prior art glass sheet bending apparatus, however, are capable of bending glass sheets which require a deep or abrupt curvature, along the periphery of the sheet, such as the curvature needed for modern automotive glasses, which are being increasingly required by the automotive industry throughout the world to be installed in modern cars.

Although some efforts in this respect have been made by workers in the past, none of said efforts has resulted in an apparatus, of very economical construction and easy operation, which may obtain the curvatures mentioned above, which are not obtainable through the use of mere gravity ring molds as those utilized in almost all the apparatus of the prior art described above.

One of said efforts, for instance, is represented by the apparatus for bending glass sheets described in U.S. Pat. No. 4,204,854, which describes an apparatus for bending heated sheets of glass transported generally horizontally on a conveyor within a furnace heating chamber, and which incorporates a holder located above the conveyor in a spaced relationship such that a heated sheet of glass can be transported under the holder. Gas such as air is blown upwardly from below the conveyor against the heated sheet of glass such that the sheet is moved upwardly into engagement with the holder. A mold ring is then movable under the holder to receive the glass sheet for bending. Vertical movement of the holder facilitates the lifting and also enables the curved surface and curved ring embodiments of the holder to bend the lifted glass sheet between the holder and the mold ring. This provides a press forming of glass sheet between the holder and the ring mold, whereby abrupt changes in curvature may be effected on the glass sheet, in order to match the design curvature. However, this apparatus not only is very expensive, but also has the disadvantage that the entire surface of the holder is pressing against the glass sheet on the mold ring, whereby at least slight marring of the glass sheet cannot be avoided.

U.S. Pat. No. 4,356,018, in turn, describes an apparatus for deep bending of glass sheets, which provides for the minimal sliding of the glass sheet with respect to a curved bending mold utilized, as well as insures accurate positioning of the glass sheet on the mold for bending to the desired shape and permits relatively abrupt end bends to be performed. In this apparatus, a heated glass sheet is initially supported against a downwardly facing surface of a holder above the curved bending mold which has an upwardly concave shape. An upward gas flow from a gas supply unit at a central portion of the glass sheet is supplied and continued as opposite extremities of the glass sheet are released and dropped downwardly onto the mold. Thereafter, termination of the upward gas flow from the gas supply unit releases the central portion of the glass sheet for bending on the mold. After bending, the mold is moved to a quench unit for tempering of the bent glass sheet. Although this apparatus, by firstly releasing the peripheral sections of the glass sheets to be deposited on the mold ring, allowing more time for the gravity bending of the glass sheet at the extremities of the mold ring, maintains the central portion of the glass sheet against the surface of the holder during a relatively longer time, and thusly provides a deep deformation, which is opposite to the desired deformation of the center of the glass sheet, and which when the center of the glass sheet is released, may cause wrinkles and other defects, on the surface of the glass sheet, whereby although this apparatus is perfectly capable of obtaining deep bends particularly on the periphery of the glass sheet, it also produces a percentage of reject bent glass sheets, due to the above mentioned defect and, in order to avoid this possibility, requires a very accurate and strict control of the timing of the operation (and a very precise and costly tooling).

U.S. Pat. No. 4,514,208, on the other hand, also describes an apparatus for use in bending heated sheets of glass transported generally horizontally on a conveyor within a furnace heating chamber, and includes a holder and a counterbalanced bending member, both of which are located above the conveyor in a spaced relationship such that a heated sheet of glass can be transported under the holder. The holder includes a curved, downwardly facing surface with spaced openings in which vacuum is drawn to receive the glass sheet from the conveyor. Gas, such as air, is blown upwardly from below the conveyor against the heated sheet of glass such that the sheet is moved upwardly and into engagement with the curved surface of the holder. The bending member then moves downwardly below the holder surface and thereafter upwardly against the heated sheet of glass to provide bending thereof to the curved shape of the holder surface. The bending member then moves back to its home position above the holder surface and a carrier mold ring moves under the supported glass, the vacuum is then terminated so the glass drops onto the ring and bends under the bias of gravity in a manner that allows the glass to be further bent. Although this apparatus is also capable of producing sharp bends on any area of the glass sheet, it also has the defect already described in connection with U.S. Pat. No. 4,204,854 of having the surface of the sheet pressed between two members, which may produce frequent marring of the glass sheet with the consequent decrease in quality of the glass sheet, to prevent this a very accurate process and expensive tooling must be made considering that said bent glass sheet may be used for the manufacture automotive glasses which must be absolutely clear.

Finally, U.S. Pat. No. 4,609,391, describes an apparatus for forming glass sheets in an accurate manner, to a deep, abrupt or complex curvature by utilizing a first curved mold that initially forms the glass sheet at a first forming station preferably by the operation of gravity. The initially formed glass sheet is moved horizontally preferably by movement on the first curved mold to a second forming station. A second curved mold of the second forming station engages the initially formed glass sheet to provide accurate forming preferably by downward movement of the second curved mold that provides the engagement thereof with the glass sheet. Although this apparatus may also provide sharp bends on any area of the glass sheet and particularly on the periphery thereof, it requires a very complicated system of transportation of the glass sheet, because firstly the glass sheet is transported by a conveyor within the furnace or lehr, then the glass sheet is deposited on the first mold and is thereafter transported thereby, with the consequent intricacy of the mechanisms necessary to effect said movements, and lastly the second or bending mold must be lifted and the glass sheet released thereby on a transfer reciprocatable conveyor to extract the sheet from the lehr. This, without avoiding the possibility of severe marring of the surface of the glass sheet, also implies the provision of very complicated and costly mechanisms for conveying the glass sheet along the bending and the heating apparatus, which results in a very costly operation.

OBJECTS OF THE INVENTION

Having in mind the defects of prior art apparatus for bending glass sheets, it is an object of the present invention to provide an apparatus for bending and tempering glass sheets which, without drastically modifying the structure of prior art gravity glass bending apparatus, will be capable of producing sharp bends on the periphery of the glass sheet with great efficiency and without any marring of the surface of the glass.

Another object of the present invention is to provide an apparatus for bending glass sheets, of the above described character, which is capable of adding a press forming operation to the gravity forming operation of prior art bending apparatus, which is of highly economical construction and performance and yet of a great efficiency for producing sharp bending of the glass sheet.

One other object of the present invention is to provide an apparatus for bending glass sheets, of the above mentioned character, which by a slight modification of the ring mold used in prior art gravity glass bending apparatus, will provide for the sharp and accurate bending of the extremities of the glass sheet without any marring of the surface of the glass.

Another and more particular object of the present invention is to provide a glass sheet bending apparatus of the above mentioned character, which provides a press forming device fixed on the ring mold, which will not interfere with the movement of said mold ring and will clear the quench section, the bending section mold and the holder mold.

One other object of the present invention is to provide a glass sheet bending apparatus of the above described character, which will not take any heat from the press area before the glass piece is tempered, and will not cause breaking of the glass in the quench section.

BRIEF SUMMARY OF THE INVENTION

The foregoing objects and others ancillary thereto are preferably accomplished as follows:

The critical peripheral sections of glass sheets are bent to a deep or sharp curvature through the use of a plurality of press forming means integrally provided on the mold ring of gravity bending and tempering horizontal lehr, said press forming means each comprising a machined press forming die articulated to a retractible arm, said press forming die having a shape complementary to the specific shape desired at the sheet glass section to be press formed, said retractible arm being actuated between a retracted and an operative or press forming position by driving means capable of providing thereto a controlled motion, speed and pressure to carry out the press forming operation an instant after the glass sheet has been deposited on the mold ring and to be retracted an instant before the glass sheet enters the tempering section.

BRIEF DESCRIPTION OF THE DRAWINGS

The novel features that are considered characteristic of the present invention are set forth with particularity in the appended claims. The invention itself, however, both as to its organization and its method of operation, together with additional objects and advantages thereof, will best be understood from the following description of specific embodiments, when read in connection with the accompanying drawings, in which:

FIG. 3 is a cross-sectional elevational view taken along the lines A—A' of FIG. 1 of the drawings, and looking in the direction of the arrows.

FIG. 4 is a cross-sectional elevational view taken along the lines B—B' of FIG. 1 of the drawings and looking in the direction of the arrows.

DETAILED DESCRIPTION

Figure 1:
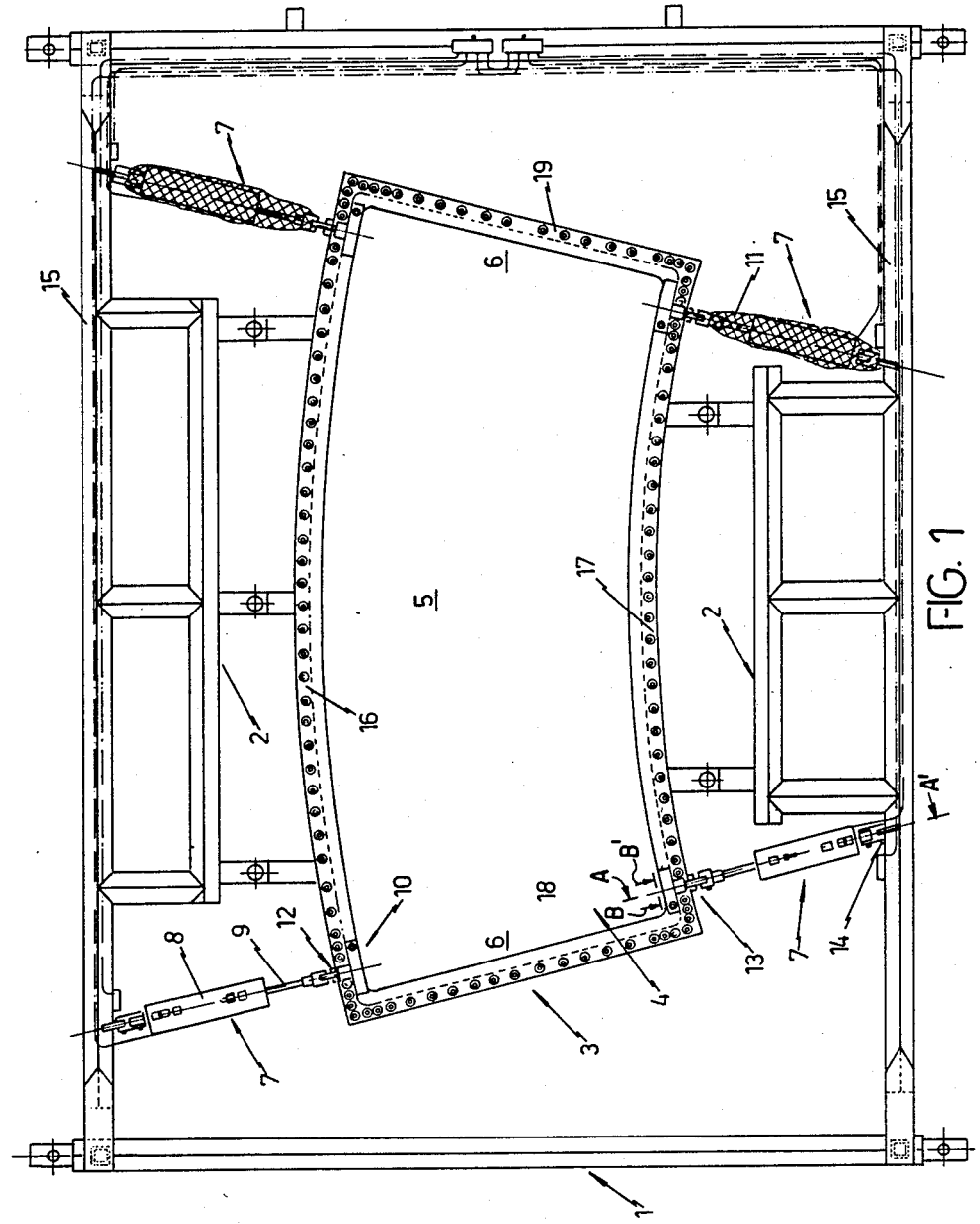
FIG. 1 is a plan view of the ring mold of a glass bending apparatus, showing the gravity bending mold ring and the press forming devices built in accordance with the present invention.
Figure 2:
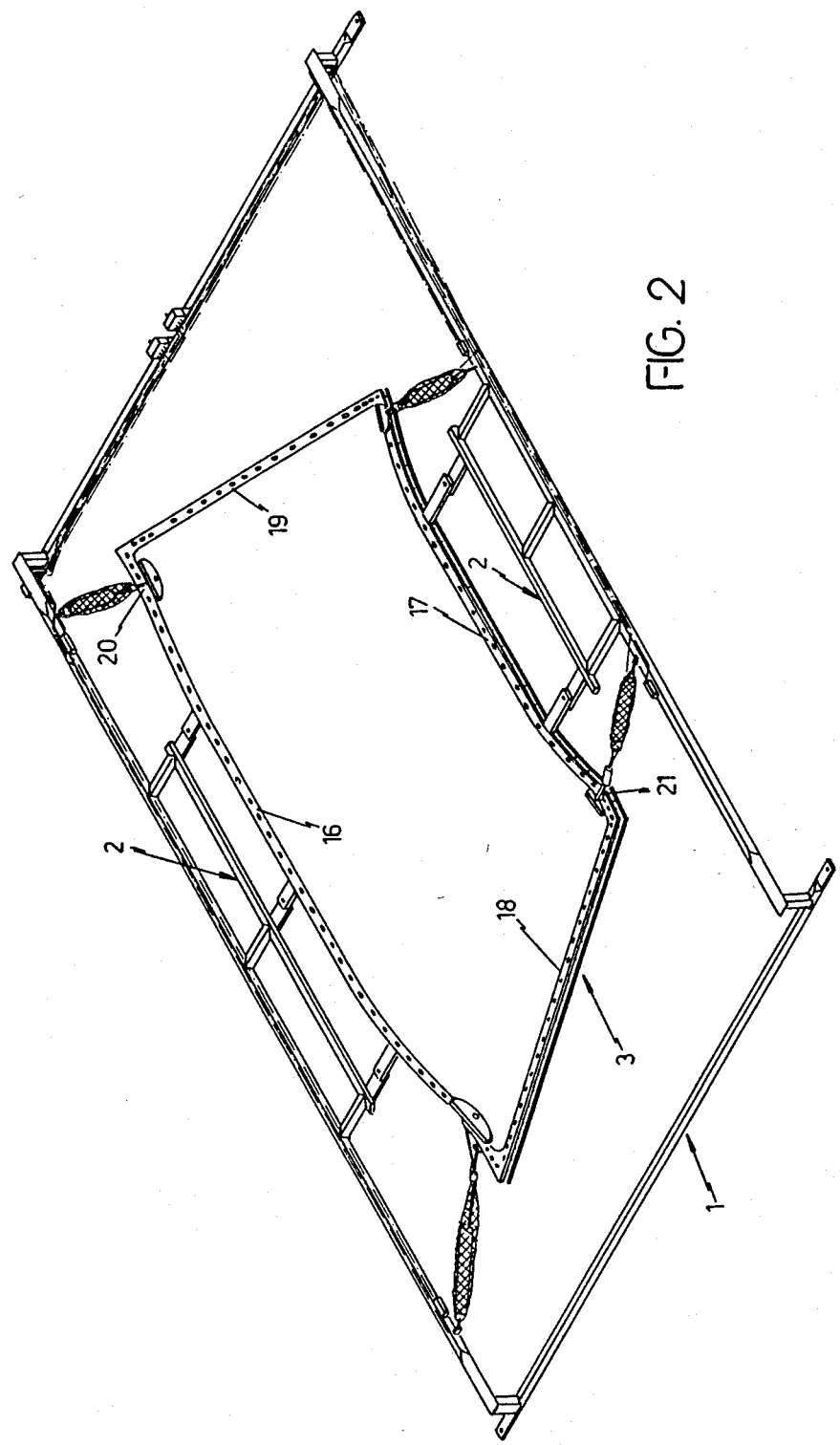
FIG. 2 is a perspective view of the mold ring and press forming devices shown in FIG. 1 of the present invention, wherein the shape of the mold ring and of the press forming dies is clearly illustrated.

Having now more particular reference to the drawings and more specifically to FIGS. 1 and 2 thereof, there is shown an apparatus for the horizontal bending of glass sheets, within a lehr wherein the glass sheets are being transported, said apparatus generally comprising a frame 1 which is normally carried by a shuttle and which comprises two parallel elongated members 15 from which a supporting structure 2 extends inwardly thereof, in order to support the ring mold 3 as is well known in the art. The ring mold 3 has a curved trapezoidal shape having two curved members 16 and 17 parallel to each other and two straight members 18 and 19 perpendicular to the members 16 and 17 and arranged in a diverging direction to each other. The glass sheet 4 is deposited on said ring mold 3 as is also well known in the art, to be formed by gravity, and the curved parallel members 16 and 17 of the mold ring are provided with a central portion having a moderate curvature and with extreme portions having a sharp curvature 20 or 21, respectively, so that the shaped glass sheet 4 may have a central portion 5 provided with such a moderate curvature, and extreme sections 6 having a sharp curvature, as is necessary for windshields for modern cars and the like.

The structure described above is common to prior art bending apparatus for glass sheets, but it is to be noted that although there are some glass pieces that are bent almost perfectly adapting to the ring mold shape by mere gravity forming, there are others, particularly such as those which are presently being ordered by the automotive industry for back and side windows for modern cars, which require extremely sharp bends particularly at the extreme of the glass sheet, throughout a short section on the periphery of the glass sheet, and which therefore normally cannot be properly shaped by mere gravity forming on a ring mold and therefore are out of tolerance and do not match the design curvature.

In order to solve the above extant problem in the prior art gravity forming ring molds, and in accordance with the present invention, four press forming devices 7 are incorporated in the ring mold structure described above, in order to assist in the bending of these short extreme sections wherein gravity is not enough to shape the glass against the ring mold.

Each one of the press forming devices 7 is provided so that it may press form the glass sheet at the center of each section which require a sharp curvature such as sections 6 of the glass sheet 5 illustrated in FIG. 1.

In accordance with a first embodiment of the invention illustrated in FIGS. 1 through 4 of the accompanying drawings, each one of the press forming devices provided in accordance with the present invention, generally comprises a pneumatic piston-cylinder assembly 8, attached by means of a pivotal support 14 to one of the frame members 15, and having a piston rod 9, which through the intermediary of a pivotal support 14, operates a press forming section 10, which will be described in more detail hereinbelow.

Each one of the devices 7 is protected by means of an asbestos or other insulating tube 11, and the four press forming devices 7 are arranged in colinear pairs, as clearly illustrated in FIGS. 1 and 2 of the drawings, so that each press forming section 10 of the press forming devices 7 be located exactly at the center of the section 6 which requires a sharp curvature, and at the two ends thereof.

Each press forming device 7, as described above, is attached in the embodiment shown in FIGS. 1 to 4 of the drawings, at one end on the supporting frame of the shuttle, and at the other end on the ring mold so that the press forming section 10 moves from the outside to the inside of the lehr bending section and having a flat profile to clear the quench section, the bending section door and the ceramic holder mold.

Having now more particular reference to FIGS. 3 and 4 of the drawings, the press forming device built in accordance with the present invention specifically comprises, in accordance with a first embodiment of the invention, a pneumatic piston-cylinder assembly 8, as described above, which is supported by means of a lug 80 fastened to a link 18 by means of a suitable bolt 19 on a pivotal support 16 having a pivot 17 and integrally joined to the member 15 of the frame. The piston-cylinder assembly has a conduit 22 for fluid and another conduit 23 for fluid, which by means of a suitable electrovalve system operate the piston within the cylinder.

The piston rod 9 is provided at the end thereof with a connecting head 24 which, by means of a pivot 25, operates a pivotal toggle 26, 27, which is in turn pivotally supported by means of pivot 30 to the lugs 29, in turn supported by means of a suitable bracket 31 to one of the members such as 16 of the ring mold.

The pivot 25 which links the toggle 26, 27 to the connecting head 24 of piston rod 9, is located at the end of the arm 26 of the toggle, whereas the pivot 30 which is supported through the lugs 29 and brackets 31 to the ring mold, is located at a lower intermediate position of the arm 26 of the toggle, in order that the action of said piston rod will be to rotate the arm 26 and consequently the toggle from an extended or press forming position as shown in FIG. 3 of the drawings, to a completely retracted position through the rotation of said arm 26 in the direction marked by the toggle shown in dotted lines in said FIG. 3 of the drawings, for a purpose which will be described more clearly hereinafter.

The arm 26 of the toggle, is angularly and integrally connected to the free end of the arm 26 and is provided, at the free end thereof, with a radius piece 28 having a curved lower surface 32 for press forming the glass sheet 4 as described above.

Each toggle has only two possible positions, namely, a retracted position and an extended or press forming position and, in each one of said positions, the toggle clears the quenches and the ceramic holder mold.

The radius piece 28, as mentioned above, has a curved bottom 32 to adapt it to the radius of curvature of the sharply curved section of the glass sheet to adequately press form the same, and said radius piece is made of graphite or of stainless steel covered on its bottom with fiberglass cloth to avoid marking of the glass and to reduce heat transmission from the glass to the radius piece. Of course that when the machined radius piece is made of graphite, said fiberglass covering will not be necessary.

Figure 5:
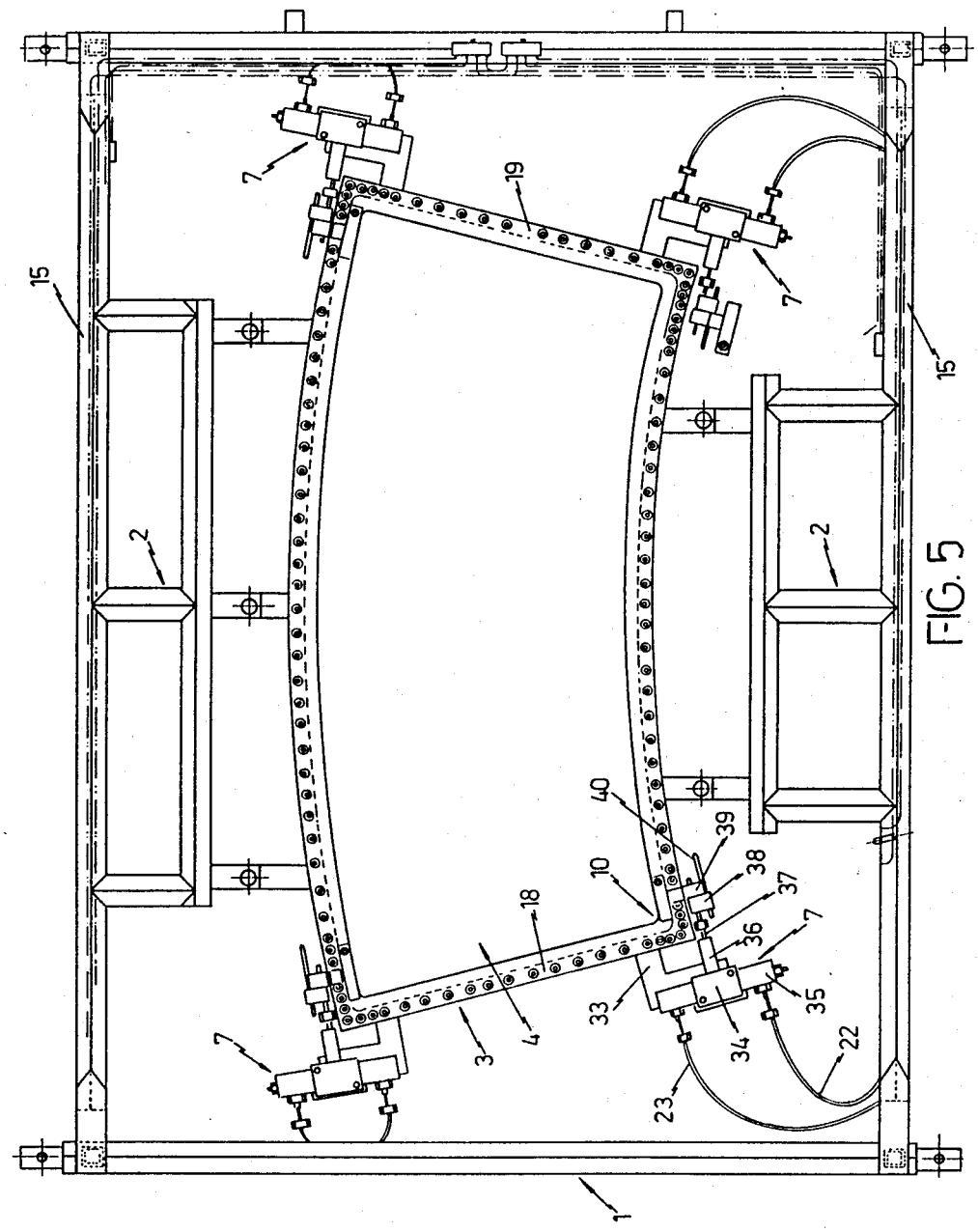
FIG. 5 is a view similar to FIG. 1 but showing a set of press forming devices built in accordance with a second embodiment of the present invention.
Figure 6:
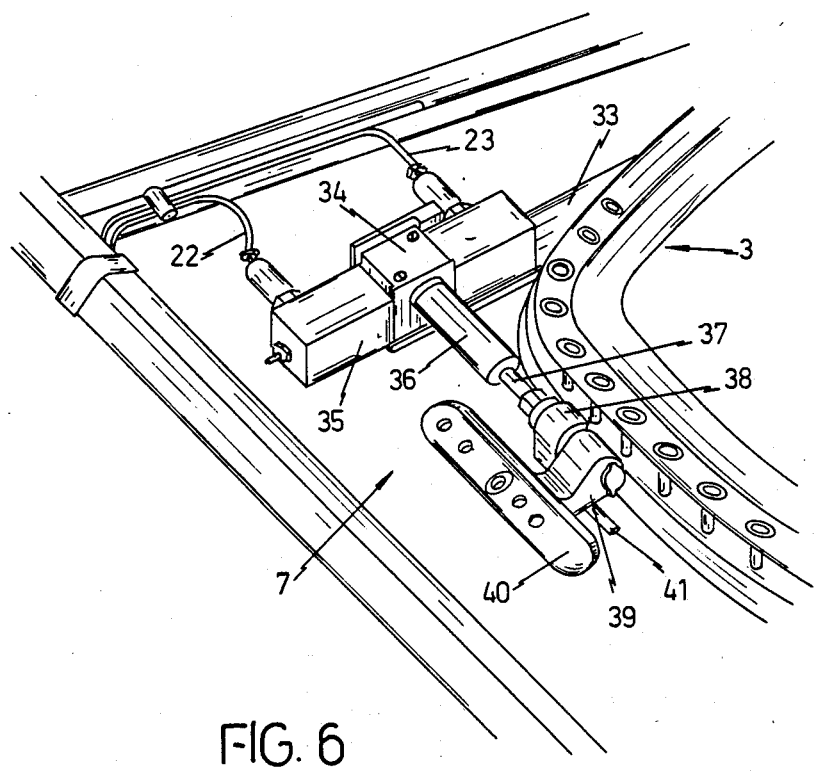
FIG. 6 is a detailed fragmentary perspective view of one of the press forming devices built in accordance with the second embodiment of the invention.

FIGS. 5 and 6 of the accompanying drawings, show a second embodiment of the press forming devices 7 of the present invention, which contain a slightly different mechanism for the actuation of the toggle which operates the radius piece. The press forming devices 7 in accordance with this second embodiment of the invention, are somewhat more compact than the devices described in connection with FIGS. 1 to 4, and operate on the principle of rotation rather than on the principle of reciprocation, being adapted for being supported from the ring mold without the need of supporting one of the ends to the main frame 1, by means of suitable brackets 33 which are fastened to the ring mold 3 and in positions which place the radius pieces exactly in the same position as the radius pieces described in connection with the embodiment illustrated in FIGS. 1 to 4 of the drawings, so as to provide a more compact unit having exactly the same results than the previously described embodiment.

As more clearly illustrated in FIG. 6 of the drawings, each press forming device 7 built in accordance with this second embodiment of the invention, comprises a pneumatic rotor 35, having connecting pipes 22 and 23 for actuating fluid which is introduced or extracted from the inner chambers of the pneumatic rotor 35, and being provided with a central supporting ring 34, which is in turn supported by the bracket 33 fastened to the ring mold 3.

The central ring 34 supports a fixed bushing 36 through which bore passes a rotating shaft 37 which is actuated by the mechanism of the hydraulic or pneumatic rotor 35, to provide rotation of the shaft 37 through an arc of sufficient size to permit the radius piece to press upon the glass sheet 4 in its press forming position, and to fully retract the radius piece outwardly of the area of the glass sheet 4.

The shaft 37 is supported, outwardly of the bushing 36, by means of a journal 38 fixed on the edge of the ring mold 3, and extends a distance beyond said journal 38, in order to support an arm 39 which is rotated in unison with said shaft 37, said arm supporting, at the free end thereof, a radius piece fastener 40, to which a radius piece (not shown in FIG. 6) exactly identical with the radius piece 28 shown in FIG. 3 of the drawings, is attached. A stop 41 is fixed to journal 38 to fix the retracted position of the radius piece.

Figure 7:
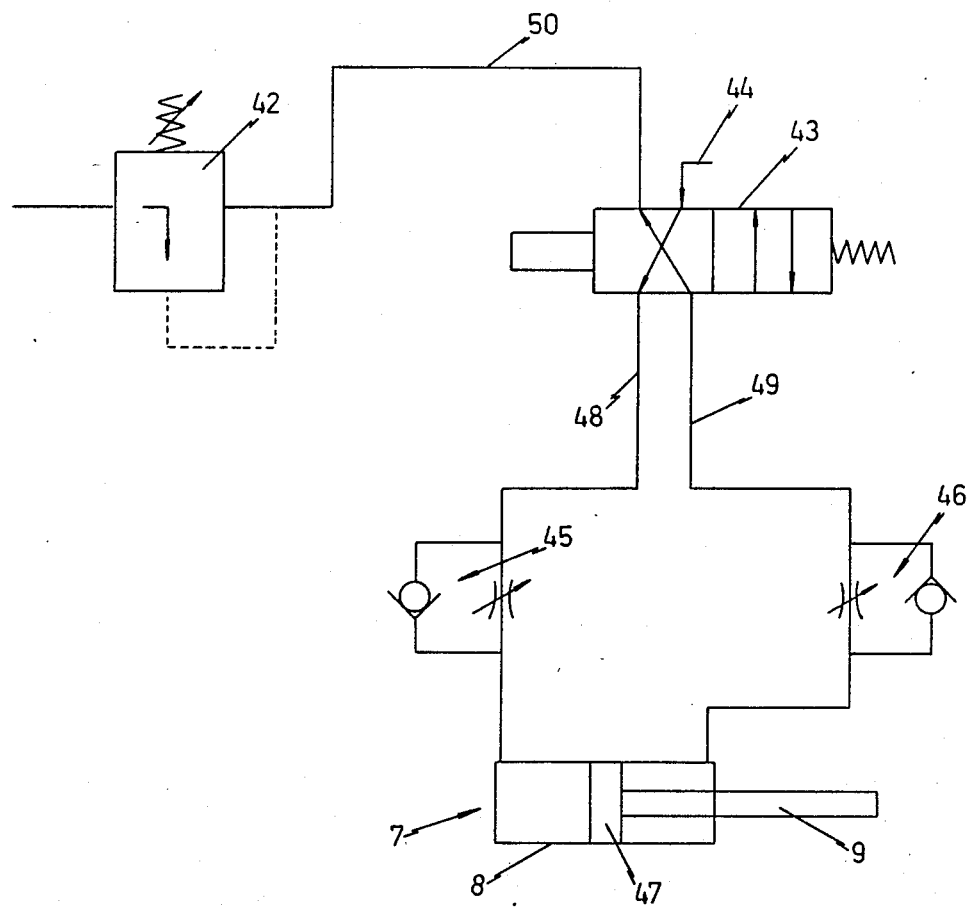
FIG. 7 is a flow diagram showing the pneumatic system used for operating the press forming devices built in accordance with the present invention.

Each one of the press forming devices 7 are actuated by means of a valve system such as that diagrammatically shown in FIG. 7 of the drawings, which in turn is controlled by means of an automatic control in order to provide precise operation of the mechanism and which has a double timer function and is initiated by the expulsion lehr computer signal.

The above mentioned initiation signal is coincident with the instant the glass drops down to the ring mold. In this manner, it is possible to control the accurate moment in which the radius pieces actuated by the respective arms press form the glass to be simultaneous with the instant in which the glass touches the ring mold.

The pneumatic system for operating the piston-cylinder assemblies of the press forming devices 7 built in accordance with the present invention may adopt a great variety of forms, without thereby departing from the scope and spirit of the present invention, provided that the duration of the radius piece pressing and the exact moment to retract the same is controlled by a double timer function, having an operating cycle as follows:

1. The glass piece is conveyed by the heating conveyor, and at the right moment it almost stops under the ceramic mold and is lifted against it. The glass piece and ceramic mold go to a higher position allowing the ring mold to pass just under the glass piece.
2. The computer sends the expulsion signal and at that moment the glass piece is dropped on to its ring mold.
3. The electronic timer delays after receiving the expulsion signal and then signals the valve to power the cylinders so the arms press form the sections.
4. At the moment the arms press form the glass sections, a second electronic timer delays before retracting the arms.
5. While the second timer is counting the ring shuttle receives the signal to exit the bending section and virtually at the same time it arrives at the quench, the timer sends the signal so the cylinder (press form arms) retracts permitting air flow over the press formed sections and ensuring a quality tempered part.
6. After tempering the ring shuttle moves to the blow-off section where the glass is removed from the ring mold clearing it for the next cycle. Both the first and second timer are independently adjustable to time the initiation of the press form as well as the duration of the press form before the glass enters into the quenches area.

However, a preferred pneumatic system for use in the apparatus of the present invention is illustrated in FIG. 7 of the drawings, and comprises an electrovalve 42 which controls the speed and pressure of the air flowing into the cylinder 8 chambers, and a double action valve 43 which receives the pressurized air from the line 44, which air passes, under the control of the electrovalve 42, through said valve 43 to line 48 in the position shown in FIG. 7, and through a dampening device 45 to the left chamber (as shown in FIG. 7) of the cylinder 8, in order to move the piston 47 and the piston rod 9 towards the right, thusly driving the radius piece to the press forming position. The air from the right chamber of cylinder 8 leaves said chamber through line 49 passing through the dampening device 46 back to valve 43 and from there through line 50 into the electrovalve 42 which controls the flow of air.

The opposite movement of the piston rod 9 is accomplished by shifting the valve 43 to the second position, whereby the flow of the air is reversed, that is, having the air from the line 44 pass to line 49, into the right chamber of cylinder 8 in order to move the piston 47 and piston rod 9 to the left thusly retracting the radius piece, and the air from the left chamber of cylinder 8 passes through line 48 again into line 50 for completing the cycle.

It may be seen from the above that an apparatus for the bending of glass sheets has been provided, which permits the accurate shaping of sharp curved sections of the glass sheet in order to also accurately match the design curvature. Also, in view of the relatively small area of contact between the surface of the glass sheet and the surface of the radius piece of the apparatus built in accordance with the present invention, there is no marking of the glass sheet, and the shaping of the critical sections of the glass sheets to conform to the design curvature is effected in a very efficient and fast manner, by coordinating the motion of the press forming devices introduced in the ring mold in accordance with the present invention, with the movement of the glass sheet itself.

Although in the above certain specific embodiments of the present invention have been shown and described, it is to be understood that many modifications thereof are possible. The present invention, therefore, is not to be restricted except insofar as in necessitated by the prior art and by the spirit of the appended claims.

What I claim is:

1. In an apparatus for bending glass sheets comprising a lehr, a horizontal conveyor for transporting glass sheets through said lehr, a ceramic holder mold to pick up the glass sheets from said conveyor by means of a vacuum which forces the glass sheet to adhere to said holder, a ring mold mounted on a shuttle to move directly below the holder, means for cutting said vacuum and release the glass sheet onto said ring mold for gravity forming of said sheet, and means for moving said shuttle to transport the glass sheet from the lehr to a quench and tempering zone, the improvement which comprises a plurality of press forming dies arranged by pairs at the side edges of the ring mold, with each die of each pair located on the end of a zone wherein a sharp curvature is desired, each of said press forming dies comprising a non-rotatable radius piece having a radius of curvature corresponding to the radius of curvature desired for said zone of the glass sheet and having a length sufficient to press over a large proportion of the width of said zone so as to produce a uniform sharp bending of the glass sheet, and means to move said dies sidewardly of the ring mold from a fully retracted position outwardly of the side edges of said ring mold to a fully extended or press forming position inwardly of the side edges of said ring mold and over the side edges of the glass sheet, whereby to more sharply bend said glass sheet in the desired zones by pressure non-rotatable contact of said dies on the periphery of said glass sheet against said ring mold.

2. In an apparatus for bending glass sheets according to claim 1, wherein said means for moving said dies from a fully retracted position to a press forming position comprises a reciprocatable pneumatic cylinder-piston assembly, having a piston rod pivotally connected to said toggle at the end thereof opposite to the end attached to said radius piece, said pivotal connection being such that when the piston rod is extended, said toggle is rotated to retract the radius piece, and viceversa.

3. In an apparatus for bending glass sheets according to claim 1, wherein said means for moving said dies from a fully retracted position to a press forming position comprises a pneumatic rotor having a rotatable piston rod which is connected perpendicularly with the end of said toggle opposite to the end attached to said radius piece, whereby rotation of said poston rod in one direction forces said toggle to rotate in unison therewith for retracting said radius piece, and viceversa.

4. In an apparatus for bending glass sheets according to claim 1, wherein said radius pieces are made of graphite in order to avoid marking of the surface of the glass sheet on which said radius piece press.

5. In an apparatus for bending glass sheets according to claim 1, wherein said radius pieces are made of steel having a coating of fiberglass on the surface which contacts said glass sheets, so as to prevent marking of the glass sheet when said radius piece contacts the same.

6. In an apparatus for bending glass sheets according to claim 1, wherein said means for moving said dies from a fully retracted position to a fully extended or press forming position are thermally insulated.

* * * * *